H. C. HOUGH.
Miter-Boxes.

No. 151,222. Patented May 26, 1874.

Witnesses:
George H. Howard
H. A. Daniels

Inventor:
H. C. Hough by
R. H. Boynton Atty

UNITED STATES PATENT OFFICE.

HORACE C. HOUGH, OF OSHKOSH, WISCONSIN.

IMPROVEMENT IN MITER-BOXES.

Specification forming part of Letters Patent No. 151,222, dated May 26, 1874; application filed April 20, 1874.

*To all whom it may concern:*

Be it known that I, HORACE C. HOUGH, of the city of Oshkosh, Wisconsin, have invented a new and useful Improvement in Miter-Boxes, of which the following is a true description, reference being had to the accompanying drawings, and to the letters of reference marked thereon, being a part of this specification.

The invention consists in combining adjustable rests or stops for the material to be cut, with adjustable guides for the saw, as hereinafter more fully set forth.

Figure 1:
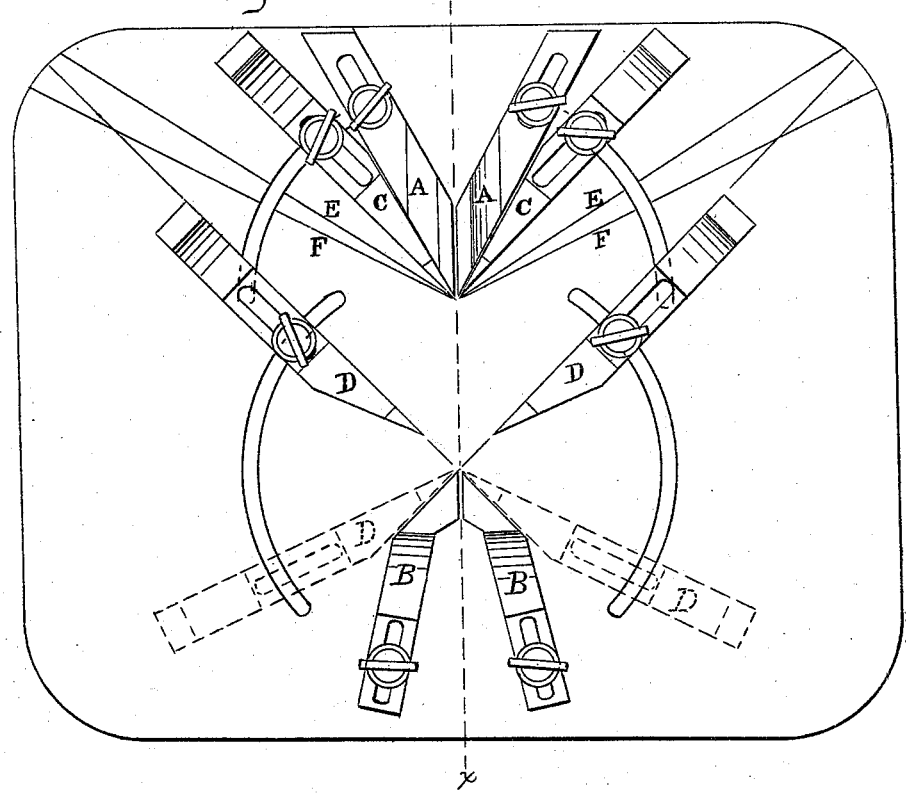
Figure 2:
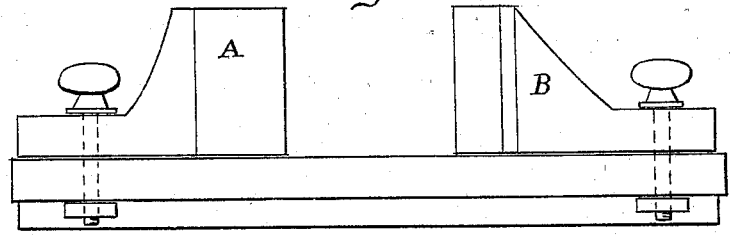
Figure 3:
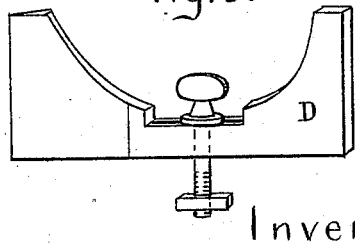

Figure 1 shows a top view of the device, with the position of the rests or stops for cutting miters from both an outside and inside measurement. Fig. 2 shows a vertical section taken on line $x\ x$ in Fig. 1. Fig. 3 is a detached view of one of the rests or stops.

A A and B B in the figures represent the saw-guides. C C represent the rests and their positions to cut a miter from an inside measurement. D D represent the rests and their positions to cut a miter from an outside measurement. E E show the position of the rests C C when adjusted to cut the bevel of a figure of a hexagonal form. F F show the position of the rests, in order to cut the bevel of a figure of an octagonal form. By a proper adjustment of the rests, moldings that are called, by architects, "sprung moldings," can be firmly held in position while cutting the bevels.

The saw-guides are made of wood or metal, or of wood faced with metal, and can be adjusted laterally so as to fit saws differing in thickness, and each pair can be adjusted in a longitudinal plane with the saw, so as to afford support to the saw in proportion to the width of the material to be cut.

I am aware that there have been many devices combining guides for the saw and rests for the material; but am not aware of any combination of parts in which the work on the material is brought to the saw at the point where it is supported by the guides.

What I claim as my invention, and wish to secure by Letters Patent, is—

1. The combination of the saw-guides A A and B B, with the rests or stops C C, when arranged substantially as shown and described, and for the purposes set forth.

2. The combination of the saw-guides A A and B B, with the rests or stops D D, when arranged substantially as shown and described, and for the purposes set forth.

H. C. HOUGH.

Witnesses:
A. LEACH,
E. H. HOUGH.